Jan. 5, 1954

J. A. CLARK 2,665,402

SPEED CONTROL CIRCUIT

Filed Aug. 22, 1951

INVENTOR.
JOHN A. CLARK
BY
Woodling and Krost,
attys.

Patented Jan. 5, 1954

2,665,402

UNITED STATES PATENT OFFICE 2,665,402

SPEED CONTROL CIRCUIT

John A. Clark, Cleveland, Ohio, assignor to The Reliance Electric and Engineering Company, a corporation of Ohio Application August 22, 1951, Serial No. 243,059

18 Claims. (Cl. 318—140)

1

The invention relates generally to motor control circuits and more particularly to direct current motor speed control circuits for obtaining small speed regulation for both motoring and regenerative current.

The present invention relates to a motor speed control circuit which is stable in operation and which has a small speed regulation; that is, a flat curve of speed versus load despite the fact that the motor may be driven as a generator and hence produce regenerative current. A direct current shunt motor is not an inherently stable machine in speed regulation because of the armature reaction which weakens the field as the load increases. This weakened field tends to increase the speed and cause an unstable condition. To make the shunt motor more stable in its speed characteristic, a series field is often added which is cumulative relative to the shunt field or reference field. This cumulative series field tends to increase the total field ampere turns as the motor load increases which will slow the motor down and provide a stable operation.

If the direct current motor is driving a load which has inertia, either mechanical or electrical, so that in some manner the load may upon occasions tend to drive the direct current motor as a generator, then any cumulative series field would become a differential field and hence would produce a large speed regulation. The present invention therefore relates to a circuit for providing a direct current motor with a series field which can never become differential relative to the shunt field of the motor, whether the current is motoring current or regenerative current, and thus a system with a small speed regulation is provided, yet one which remains stable.

The invention is directed particularly to direct current motor speed control circuits. Speed regulation on variable voltage, direct current drives is very poor at low voltage and speed, unless special corrective measures are taken. The problem is further complicated by instability and sometimes by also having overhauling loads in which the motor becomes a generator.

The present invention relates to a motor speed control circuit for a variable voltage direct current drive which has a very small speed regulation for both motoring and regenerating current loads, is stable in operation and is capable of going to a very low percentage of full voltage speed.

Poor speed regulation is inherent in a variable voltage drive at low voltages because the voltage drop in the motor due to load current becomes a large part of the applied voltage. The applied voltage can be made to rise with increasing load current if the generator is over-compounded at low voltage. An over-compounded generator has two disadvantages; namely, it prevents reaching as low a voltage and speed as may be desired and it tends to produce instability.

The minimum voltage may be reduced by incorporating a suicide field in the generator. Such a field is a self-excited shunt field of the proper design so connected that it produces a magnetizing force in the opposite direction to that of the main field. Any voltage produced by the generator thus excites this field which in turn, reduces the voltage producing it, or "suicides" the voltage. This field also has a strong stabilizing effect which is essential for low voltage operation where the generator is over-compounded.

The main field of the motor normally has some series field wound on it for the purpose of stability, particularly at full voltage operation. When the load on the motor becomes over-hauling, the motor acts as a generator and the series field normally would become differential or negative with respect to the main field because the regenerative current flows in the opposite direction to the motoring current. The differential generator does not have good speed regulation in this system and therefore must be avoided. In this invention, a method is disclosed for keeping the series field of the motor always cumulative with respect to the main field by means of a rectifier circuit.

Therefore, an object of the invention is to provide a direct current motor control circuit for minimum speed regulation, even though the load varies from motoring to regenerating, by means of a compound wound variable voltage generator and a shunt motor with a series field controlled by a rectifier so that the series field is always cumulative.

Another object of this invention is to provide a motor series field control circuit that will produce a cumulative series field for either direction of current flow through the armature of the motor through the use of a rectifier circuit.

A further object of this invention is to provide a means of keeping the motor series field cumulative with respect to the main field for one direction of current flow and to bypass or render it ineffective for the other direction of current flow.

Another object of this invention is to provide a circuit means for utilizing a generator whose inherent characteristic is such as to provide a consistently low voltage due to a suicide field. The low voltage applied to the motor provides a low speed of the motor armature.

Another object of this invention is to provide a variable voltage, variable speed system which, in addition to the aforementioned features, is stable in operation due to the proper design of the rotating machines and adjustment of the control circuit.

Another object of the invention is to provide a direct current motor control circuit with rectifier and field winding means to establish a series field for the motor which is cumulative to a reference field for both motoring or regenerative current or which may be out of the circuit for either direction of current.

An obect of the invention is to provide a direct current motor with a series field which is cumulative to a reference field for one direction of current through the motor and which is rendered ineffective for current of the opposite direction.

Another object of the invention is to provide a motor control circuit wherein the speed regulation is kept as small as possible for both motoring and regenerative currents through the motor armature and wherein the stability of the system is retained.

Still another object of the invention is to provide the combination of a direct current generator which has a reference field and a self-excited suicide field in opposition thereto to give a low voltage output condition of the generator and stability and a direct current motor energized from the generator which motor has a cumulative series field in the regenerative current direction and which may or may not have a series field in the motoring current direction, but where such a series field is provided, this series field will also be cumulative for stability.

Other objects and a fuller understanding of this invention may be had by referring to the following description and claims, taken in conjunction with the accompanying drawing in which:

Figure 1:
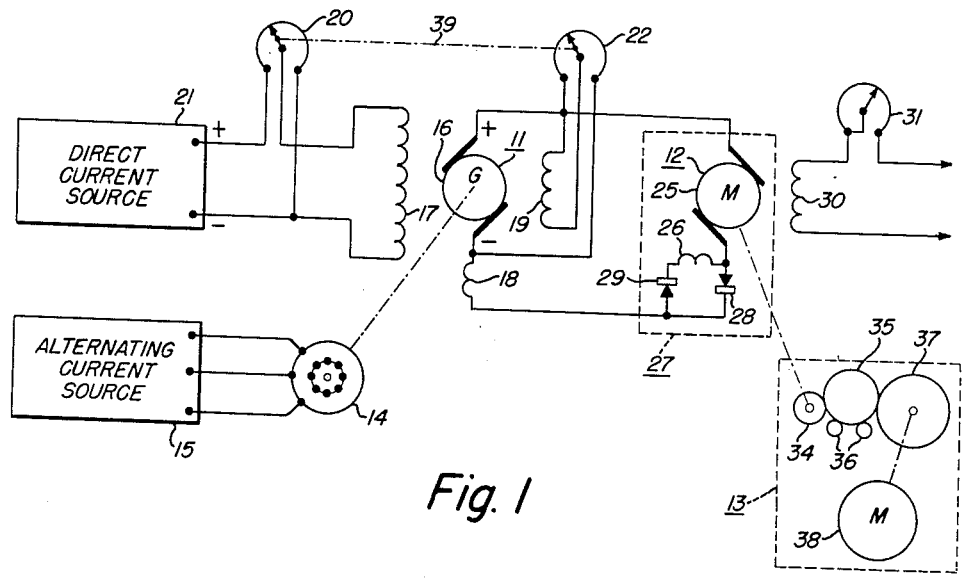
Figure 1 is a schematic diagram of a motor control circuit embodying the invention.

The Figure 1 shows a schematic diagram of the invention wherein a direct current generator 11 supplies current to a direct current motor 12 which in turn drives a load indicated generally by the reference number 13. The generator 11 has been shown as being driven from an induction motor 14 energized from an alternating current source 15.

The generator 11 includes an armature 16, a separately excited shunt field 17, a cumulative series field 18 and a self-excited suicide field 19. The shunt field 17 is connected across a part of a first rheostat 20 which in turn is connected across a direct current source 21. A second rheostat 22 is connected across the armature 16 and the suicide field 19 is connected across a part of this second rheostat.

The motor 12 includes an armature 25 and a series field 26. The armature 25 and series field 26 may be considered as the direct current load 27 of the generator 11. A first rectifier 28 is connected in series with the armature 25 and a second rectifier 29 is connected in series with the series field 26 with this last mentioned series combination connected in parallel with the first rectifier 28. In this parallel combination, the first and second rectifiers 28 and 29 are connected in opposition relative to the armature 25. The motor 12 is also provided with a separately excited shunt field 30 which may be energized from any suitable direct current source not shown and may be adjusted by any means for motor speed control such as by the third rheostat 31. Obviously, the shunt field 30 may be energized from the direct current source 21 if this is convenient.

An application of this particular circuit is where the motor 12 drives an overhauling load and as an example of such an overhauling load, the load 13 is shown as including a work drive roller 34 driven from the motor 12. The work drive roller frictionally drives a workpiece 35 on a centerless grinder machine tool and this workpiece rests on support rollers 36. A grinding wheel 37 is driven from a prime mover 38 and this grinding wheel is adapted to be moved into engagement with the workpiece 35 to grind this workpiece. The motor 12 is intended to drive the workpiece 35 through the work drive roller 34 at a desired adjustable speed so that when the grinding wheel 37 is brought into engagement with the workpiece 35, there will be no gouging of the workpiece because the workpiece will already be up to the desired speed. As may be well understood, the horse power or torque of the prime mover 38 will be many times larger than the power requirements of the motor 12 because the prime mover 38 must actually produce power to remove metal from the workpiece 35, whereas the motor 12 only needs to overcome the friction and windage losses in the rollers 34 and 36 and the workpiece 35. Further it will be seen that when the grinding wheel 37 begins to grind the workpiece, there will be a tendency for the workpiece to drive the roller 34 which in turn will drive the motor 12. This is the overhauling load condition mentioned previously. In this particular application, the motoring current supplied to the motor armature 25 is about one ampere and the overhauling or regenerative current delivered by the motor 12 to the generator 11, which at that time will be acting as a motor, is about two and one-half amperes. The particular problem is to provide a small speed regulation for the motor 12 whether the motor 12 is driving the workpiece 35 or vice versa.

To provide the small speed regulation desired in the motor 12, this motor has been provided with the series field 26 which is in the circuit only during the period of regenerative current flow. During normal motoring current the series field 26 is out of the circuit since the current flowing through the motor and generator armature flows through the first rectifier 28. When the load 13 drives the motor 12 for regenerative current, then the current will flow through the second rectifier 29 and the series field 26. This series field is wound so that the effect thereof is cumulative relative to the separately excited shunt field 30. This cumulative compound dynamo-electric machine 12 which is now acting as a generator has a small speed regulation because of the added ampere turns provided by the series field 26. This series cumulative field on the motor 12 is combined with the generator 11 which has the suicide field 19 to give a complete motor generator drive system which has good stability and yet a small speed regulation.

The series field 18 on the generator 11 is cumulative relative to the shunt field 17 when the generator 11 is acting as a generator. However, when this generator 11 is acting as a motor, then the series field 18 will have a differential effect relative to the shunt field 17. This differential effect of the series field 18 will provide a small speed regulation to this machine 11 when it is acting as a motor. The generator 11, when acting as a motor, will tend to drive the alternating current induction motor 14 as an induction generator and which will in turn attempt to pump power back into the alternating current source 15. In this particular application the motor 14 may generally have a horse power rating of about four horse power, the generator 11 may have a rating of about two and one-half kilowatts, and the motor 12 may have the rating of about three-quarter horse power. This three-quarter horse power rating of the motor 12 corresponds to a rated load current of three and one-half amperes. With an overhauling current of two and one-half amperes, the motor 12 would have an electrical output equivalent to about one-half horse power. This one-half horse power output when transmitted back through the generator 11 to the motor 14 will not have much effect on the speed of this motor 14 because of the quite large size of this motor with respect to the power that is being supplied to it. This means that the entire system will be inherently stable and the speed of the motor 12 will be very nearly constant whether this motor is acting as a motor or a generator.

The generator 11 is required to supply a wide range of terminal volts to the motor 12 so that this motor can go to very low speed settings. Because of the residual magnetism in the field structure of the generator 11, the minimium voltage of the generator 11 would be in the neighborhood of six to ten percent of the rated terminal voltage of the generator. This would mean that minimum speed of the motor 12 would be about eight percent of its rated speed. The suicide field 19 has been provided to permit the terminal voltage of the generator to go to a very low minimum value. The suicide field functions in its prescribed manner because whenever the generator tends to supply a terminal voltage, this terminal voltage is applied to the suicide field 19, which is in opposition to the reference shunt field 17 and hence this suicide field 19 supplies ampere turns which kill the terminal voltage of the generator. The first and second rheostats 20 and 22 have been shown as being interconnected by the mechanical link 39 so that both of these rheostats are moved together. This mechanical link is provided so that when a maximum energization is supplied to the shunt field 17, there is a minimum energization supplied to the suicide field 19. Conversely when a minimum voltage is supplied to the shunt field 17, a maximum energization is supplied to the suicide field 19. This has the desired effect of having the suicide field 19 in the circuit whenever a low speed condition of the motor 12 is desired, and to have this suicide field 19 practically out of the circuit whenever a high speed condition of the motor 12 is desired. The series field 26 which is cumulative during regenerative current provides a low speed regulation, the series field 18 which is differential during the regenerative current provides a low speed regulation, and the oppositely controlled suicide and shunt fields 19 and 17 provide a high degree of stability so that the entire system has a low speed regulation and a high degree of stability for all speed ranges of the motor 12 regardless of whether the motor 12 is driving the load 13, or whether the load 13 is driving the motor 12.

Figure 2:
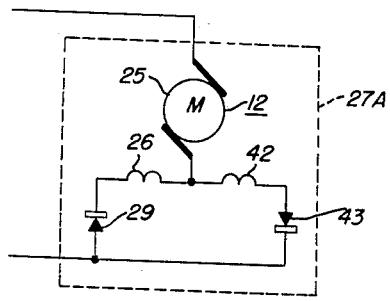
Figure 2 is a modification of a part of the circuit of Figure 1.

The Figure 2 shows a load 27A which may be substituted for the load 27 of the Figure 1. This load 27A again includes the motor 12 which has the series field 26 and the rectifier 29, but in addition has a series field 42 and a rectifier 43. The series combination of the series field 42 and the rectifier 43 is connected in parallel with the series combination of the series field 26 and rectifier 29. The rectifier 43 will pass motoring current to the series field 42 which is preferably wound cumulative to the separately excited shunt field 30. The modification of Figure 2 adds greater stability to the circuit shown in Figure 1 since a cumulative series field on a motor will add stability. The circuit modification of Figure 2 has another advantage in that the series fields 26 and 42 do not need to have the same ampere turns, they may be designed to produce the desired amount of cumulative compounding.

Figure 3:
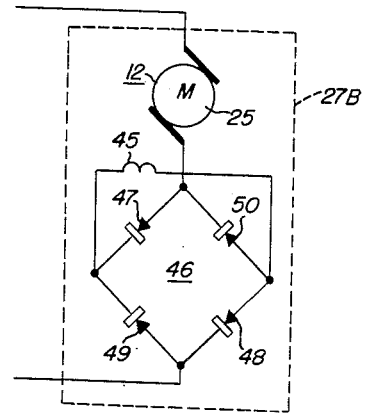
Figure 3 is a further modification of the circuit of Figure 1.

Figure 3 shows a still further modification of a load 27B which may be substituted for the load 27 in the circuit of Figure 1. This load includes the motor 12 and a series field 45. The series field 45 is energized from the output terminals of a bridge rectifier 46 which comprises the motoring rectifiers 47 and 48 and the overhauling rectifiers 49 and 50. During conditions of motoring current supplied to the motor 12, the rectifiers 47 and 48 conduct current to the series field 45 and during periods of regenerative or overhauling current, the rectifiers 49 and 50 pass current to this series field 45. In both cases, the current direction to the series field 45 is the same. This series field 45 is wound to be cumulative in effect to the separately excited shunt field 30, and hence the low speed regulation and stability is achieved as mentioned above.

Although the invention has been described in its preferred form with a certain degree of particularity, it is understood that the present disclosure of the preferred form has been made only by way of example and that numerous changes in the details of circuit construction and the combination and arrangement of circuit elements may be resorted to without departing from the spirit and the scope of the invention as hereinafter claimed.

What is claimed is:

1. An electrical circuit, comprising first and second dynamoelectric machines each having an armature, first and second field windings on said first dynamoelectric machine and third and fourth field windings on said second dynamoelectric machine, first circuit means for energizing the first field winding as a separately excited winding, second circuit means for connecting said second field winding across the armature of said first dynamoelectric machine to have a differential effect relative to said first field winding when said first dynamoelectric machine acts as a generator, means in said first and second circuit means to oppositely control the energization to said first and second field windings, third circuit means for connecting in series said armatures, means for establishing a reference field for said second dynamoelectric machine, rectifier means, fourth circuit means for connecting said rectifier means to establish first and second opposing unidirectional paths, means for connecting said third and fourth field windings in series in said first and second paths, respectively, and means for connecting said fourth circuit means in series in said third circuit means with said first and second paths being opposed relative to the armature of said second dynamoelectric machine whereby said first path passes current of one sense to said third field winding and said second path passes current of the opposite sense to said fourth field winding and each of said third and fourth field windings being cumulative relative to the reference field of said second dynamoelectric machine.

2. An electrical circuit, comprising first and second dynamoelectric machines each having an armature, means for establishing a reference field on each of said dynamoelectric machines, means for establishing a field for said first dynamoelectric machine in opposition to said reference field thereof, means for governing the energization of said opposing field in accordance with the voltage across the armature of said first dynamoelectric machine, means to effect opposite and simultaneous variations in the energization supplied to said reference and opposing fields of said first dynamoelectric machines, means for connecting in series said armatures, rectifier means, first circuit means for connecting said rectifier means to establish first and second opposing unidirectional paths, a field winding on said second dynamoelectric machine connected in series in one of said first and second paths, and means for connecting said first circuit means in series with said armatures with said first and second paths being opposed relative to said armatures.

3. An electrical circuit, comprising first and second dynamoelectric machines each having an armature, means for establishing a reference field for each of said dynamoelectric machines, means for establishing a field for said first dynamoelectric machine in opposition to said reference field thereof, means for connecting in series said armatures, a field winding on said second dynamoelectric machine, and means for energizing said field winding in response to the armature current and only cumulative to the reference field of said second dynamoelectric machine despite the direction of current through said armatures.

4. A motor speed control system, comprising a direct current generator and a direct current motor each having an armature, means for establishing a reference field for said generator, means for establishing a field for said generator in opposition to said reference field, means for connecting said motor armature to be responsive to the output of said generator armature, means for establishing a reference field for said motor, a field winding on said motor, and means for energizing said motor field winding in response to the motor armature current and only cumulative to said motor reference field despite motoring and regenerative current through said motor armature.

5. A motor speed control system, comprising a direct current generator and a direct current motor each having an armature, first and second field windings on said generator, field winding means on said motor, first circuit means for energizing the first field winding of said generator as a separately excited winding, second circuit means for connecting said second generator field winding across the generator armature as a self-excited shunt field winding and differential relative to said first generator field winding, means in said first and second circuit means to control in opposition the energization to said first and second generator field windings, third circuit means for connecting in series said armatures to energize said motor armature from said generator armature, means for establishing a reference field for said motor, rectifier means, fourth circuit means for connecting said rectifier means to establish opposing unidirectional current paths, means for connecting said motor field winding means in series in one of said paths, and means for connecting said fourth circuit means in series in said third circuit means with said unidirectional paths being opposed relative to said motor armature and with said motor field winding means being cumulative relative to said motor reference field for at least one of motoring and regenerative current.

6. A motor speed control system, comprising a direct current generator and a direct current motor each having an armature and first and second field windings, first circuit means for energizing the first field winding of said generator as a separately excited winding, second circuit means for connecting said second generator field winding across the generator armature as a self-excited shunt field winding and differential relative to said first generator field winding, means in said first and second circuit means to oppositely control the energization to said first and second generator field windings, third circuit means for connecting in series said armatures to energize said motor armature from said generator armature, means for establishing a reference field for said motor, rectifier means, fourth circuit means for connecting said rectifier means to establish first and second opposing unidirectional paths, means for connecting said first and second motor field windings in series in said first and second paths, respectively, and means for connecting said first circuit means in series in said third circuit means with said first and second paths being opposed relative to said motor armature whereby said first path passes motoring current to said first motor field winding and said second path passes regenerative current to said second motor field winding and each of said first and second motor field windings being cumulative relative to said motor reference field for motoring and regenerative current, respectively.

7. A motor speed control system, comprising a direct current generator and a direct current motor each having an armature, first and second field windings on said generator, field winding means on said motor, first circuit means for energizing the first field winding of said generator as a separately excited winding, second circuit means for connecting said second generator field winding across the generator armature as a self-excited shunt field winding and differential relative to said first generator field winding, first and second rheostats connected in said first and second circuit means and connected in tandem to control in opposition the energization to said first and second generator field windings, third circuit means for connecting in series said armatures to energize said motor armature from said generator armature, means for establishing a reference field for said motor, rectifier means, means for connecting said rectifier means in circuit to provide first and second paths for opposing unidirectional currents, means for connecting said field winding means of said motor in series in at least one of said paths, and means for connecting the combination of first and second paths in series in said third circuit means with said motor field winding means being cumulative relative to said motor reference field for at least one of motoring and regenerative currents.

8. A motor speed control system, comprising a direct current generator and a direct current motor each having an armature and first and second field windings, first circuit means for energizing the first field winding of said generator as a separately excited winding, second circuit means for connecting said second generator field winding across the generator armature as a self-excited shunt field winding and differential relative to said first generator field winding, first and second rheostats connected in said first and second circuit means and connected in tandem to control in opposition the energization to said first and second generator field windings, third circuit means for connecting in series said armatures to energize said motor armature from said generator armature, means for establishing a reference field for said motor, first and second rectifiers, means for connecting said first and second motor field windings in series with said first and second rectifiers, respectively, means for connecting said series combinations in parallel, and means for connecting said parallel combination in series in said third circuit means with said rectifiers oppositely connected relative to said motor armature whereby said first rectifier passes motoring current to said first motor field winding and said second rectifier passes regenerative current to said second motor field winding with each of said first and second motor field windings being cumulative relative to said motor reference field for motoring and regenerative current, respectively.

9. A motor speed control system, comprising a direct current generator and a direct current motor each having an armature, first, second, and third field windings on said motor, first and second field windings on said generator, first circuit means for energizing the first field windings of each of said generator and motor as a separately excited winding, second circuit means for connecting said second generator field winding across the generator armature as a self-excited shunt field winding and differential relative to said first generator field winding, first and second rheostats connected in said first and second circuit means and connected in tandem to control in opposition the energization to said first and second generator field windings, third circuit means for connecting in series said armatures to energize said motor armature from said generator armature, first and second rectifiers, means for connecting said second and third motor field windings in series with said first and second rectifiers, respectively, means for connecting said series combinations in parallel, and means for connecting said parallel combination in series in said third circuit means with said rectifiers oppositely connected relative to said motor armature whereby said first rectifier passes motoring current to said second motor field winding and said second rectifier passes regenerative current to said third motor field winding with each of said second and third motor field windings being cumulative relative to said first motor field winding for motoring and regenerative current, respectively.

10. A motor speed control system, comprising a direct current generator and a direct current motor each having an armature and first, second and third field windings, first circuit means for energizing the first field windings of each of said generator and motor as a separately excited winding, second circuit means for connecting said second generator field winding across the generator armature as a self-excited shunt field winding and differential relative to said first generator field winding, first and second rheostats connected in said first and second circuit means and connected in tandem to control in opposition the energization to said first and second generator field windings, third circuit means for connecting in series said armatures and said third generator field winding to energize said motor armature and with said third generator field winding acting as a series field winding cumulative relative to said first generator field winding, first and second rectifiers, means for connecting said second and third motor field windings in series with said first and second rectifiers, respectively, means for connecting said series combinations in parallel, and means for connecting said parallel combination in series in said third circuit means with said rectifiers oppositely connected relative to said motor armature whereby said first rectifier passes motoring current to said second motor field winding and said second rectifier passes regenerative current to said third motor field winding with each of said second and third motor field windings being cumulative relative to said first motor field winding for motoring and regenerative current, respectively.

11. An electrical circuit, comprising first and second dynamoelectric machines each having an armature, first and second field windings on said first dynamoelectric machine and a third field winding on said second dynamoelectric machine, first circuit means for energizing the first field winding as a separately excited winding, second circuit means for connecting said second field winding across the armature of said first dynamoelectric machine to have a differential effect relative to said first field winding when said first dynamoelectric machine acts as a generator, means in said first and second circuit means to oppositely control the energization to said first and second field windings, third circuit means for connecting in series said armatures, means for establishing a reference field for said second dynamoelectric machine, first and second rectifiers, fourth circuit means for connecting said rectifiers to establish first and second opposing unidirectional paths, means for connecting said third field winding in series in said first path, and means for connecting said fourth circuit means in series in said third circuit means with said first and second paths being opposed relative to the armature of said second dynamoelectric machine whereby said first path passes current of one sense to said third field winding and said second path passes current of the opposite sense and excluding any series field winding and said third field winding being cumulative relative to the reference field of said second dynamoelectric machine.

12. An electrical circuit, comprising first and second dynamoelectric machines each having an armature, first and second field windings on said first dynamoelectric machine and a third field winding on said second dynamoelectric machine, first circuit means for energizing the first field winding as a separately excited winding, second circuit means for connecting said second field winding across the armature of said first dynamoelectric machine to have a differential effect relative to said first field winding when said first dynamoelectric machine acts as a generator, means in said first and second circuit means to oppositely control the energization to said first and second field windings, third circuit means for connecting in series said armatures, means for establishing a reference field for said second dynamoelectric machine, bridge rectifier means having pairs of input and output terminals, means for connecting said third field winding across the output terminals of the bridge, and means for connecting said input terminals of said bridge in series in said third circuit means with said third field winding being cumulative relative to the reference field of said second dynamoelectric machine.

13. An electrical circuit, comprising first and second dynamoelectric machines each having an armature, means for establishing a reference field for each of said dynamoelectric machines, means for establishing a field for said first dynamoelectric machine in opposition to said reference field thereof, means for connecting in series said armatures, a field winding on said second dynamoelectric machine, and unidirectional current conducting means for energizing said field winding in response to the armature current and only cumulative to the reference field of said second dynamoelectric machine despite the direction of current through said armatures.

14. A motor speed control system, comprising a direct current generator and a direct current motor each having an armature, means for establishing a reference field for said generator, means for establishing a field for said generator in opposition to said reference field, means for connecting said motor armature to be responsive to the output of said generator armature, means for establishing a reference field for said motor, a field winding on said motor, and unidirectional current passing means for energizing said motor field winding in response to the motor armature current and only cumulative to said motor reference field despite motoring and regenerative current through said motor armature.

15. An electrical circuit, comprising first and second dynamoelectric machines each having an armature, means for establishing a first field on each of said dynamoelectric machines, means for establishing a field for said first dynamoelectric machine in oppostion to said first field thereof, rectifier means, first circuit means for connecting said rectifier means to establish first and second opposing unidirectional paths, a field winding on said second dynamoelectric machine connected in series in one of said first and second paths, and means for connecting said first circuit means in series with said armatures with said first and second paths being opposed relative to said armatures.

16. An electrical circuit, comprising a generator and a motor each having an armature, means for establishing a first field on said motor, rectifier means, first circuit means for connecting said rectifier means to establish first and second opposing unidirectional paths, a field winding on said motor connected in series in one of said first and second paths, and means for connecting said first circuit means in series with said armatures with said first and second paths being opposed relative to said armatures.

17. An electrical circuit, comprising a generator and a motor each having an armature, means for establishing a first field on said motor, means for connecting in series said armatures, a field winding on said motor, and rectifier means for energizing said field winding in response to the armature current and only cumulative to said first field of said motor despite the direction of current through said armatures.

18. An electrical circuit, comprising a generator and a motor each having an armature, means for establishing a first field on said motor, rectifier means, first circuit means for connecting said rectifier means to establish first and second opposing unidirectional paths, a field winding on said motor connected in series in only one of said first and second paths, and means for connecting said first circuit means in series with said armatures with said first and second paths being opposed relative to said armatures, whereby said field winding is not in circuit for motoring current but is connected cumulatively to said first field for regenerative current of said motor.

JOHN A. CLARK.

References Cited in the file of this patent

UNITED STATES PATENTS

| Number | Name | Date |
|---|---|---|
| 1,964,589 | Merrill | June 26, 1934 |